Figure 1:
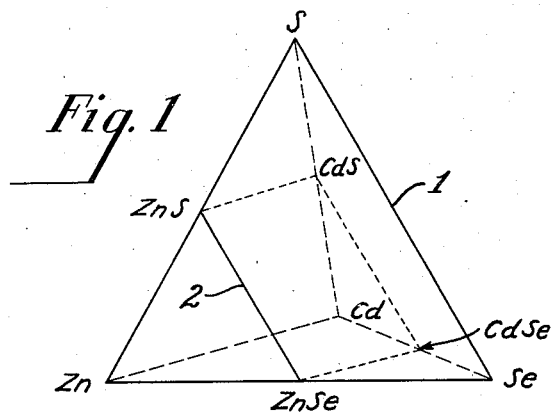

INVENTOR.
Humboldt W. Leverenz
BY
ATTORNEY.

Patented July 26, 1949

2,477,070

UNITED STATES PATENT OFFICE 2,477,070

HIGH EFFICIENCY BLUE-EMITTING ZINC CADMIUM SULFO-SELENIDE PHOSPHOR

Humboldt W. Leverenz, Princeton, N. J., assignor to Radio Corporation of America, a corporation of Delaware Application June 29, 1946, Serial No. 680,372

5 Claims. (Cl. 252—301.6)

This invention relates to improvements in inorganic crystalline materials which are visibly luminescent when excited by energy within a certain band of wavelengths. More particularly, it relates to improvements in inorganic phosphor materials having peak emission within a very restricted portion of the visible spectrum.

Heretofore, the best luminescent materials having peak emissions in the blue range of about 4,400 to 4,800 Å. have been those consisting of the well known zinc and cadmium sulfides activated with silver. These previously known phosphors have relatively high luminescence before processing but after being subjected to the operations necessary to incorporate them into a screen in a cathode ray tube, their efficiency drops off sharply.

There have now been discovered a new group of phosphor compositions having very high peak emission in the blue range. These phosphors retain a high efficiency, even after processing, and remain stable over prolonged periods. These compositions contain the ions, zinc, sulfur, and selenium, and usually, although not necessarily, cadmium. They are activated only with silver. Phosphor compositions containing the four basic ions and either with or without silver or copper as activators have been described in a co-pending application, Serial No. 678,589, filed June 22, 1946, and assigned to the present assignee. Although containing at least three and sometimes all of the same four basic ions, zinc, cadmium, sulfur, and selenium, the materials embodied in the present invention fall outside the range of compositions disclosed in the said application since those compositions emit in the range extending from green to red. At the time the earlier invention was made, all data seemed to indicate that all compositions containing the four basic ions, but falling outside the prescribed limits, either did not emit at all or had efficiencies so low as not to be of practical value. However, it has been unexpectedly found that a certain other range of compositions of the four ions and sometimes of only three of them emits very strongly in the blue and that emission is very stable under even adverse conditions of processing.

It is an object of the present invention to provide silver activated phosphor compositions containing Zn, Cd, S, and Se ions which emit strongly in the blue region of the spectrum.

Another object is to provide phosphor compositions having peak emission between 4,400 and 4,800 Å. which are highly stable.

Another object is to provide phosphor compositions having peak emission between 4,400 and 4,800 Å. which absorb relatively little visible light.

Another object is to provide phosphor compositions particularly useful for transforming invisible radiations such as cathode rays, alpha particles, ultraviolet, X-rays, gamma rays, and other corpuscular or undulatory radiations into blue light which is particularly favorable for actuating blue-sensitive photoresponsive devices such as photomultipliers.

Still another object is to provide a blue-emitting phosphor which can be combined with a complementary, efficient, yellow-emitting (a green-emitting plus red-emitting) phosphor(s) to produce a phosphor having increased efficiency of white-emission useful in television or for general illumination.

These and other objects will be more apparent and the invention will be better understood from the description which follows including the accompanying drawings of which, Fig. 1 is a geometrical representation of a system of chemical compositions containing zinc, cadmium, sulfur, and selenium, showing a plane defining that particular part of the system in which the four ions are present in stoichiometrical proportions.

Figure 2:
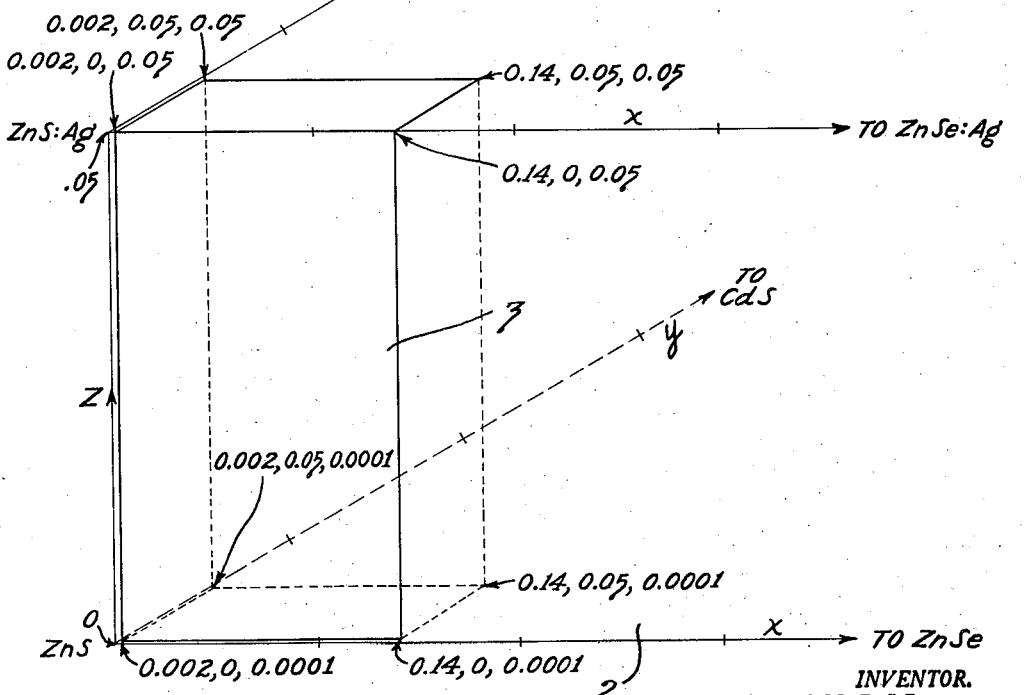

Fig. 2 is a geometrical representation of the compositions of the present invention which contain zinc, cadmium, sulfur, and selenium within the limits of the intersecting plane of Fig. 1, plus an added activator. The base horizontal plane of this figure is the rectangular plane shown in Figure 1.

Referring to Figure 1, the tetrahedron 1 represents all possible chemical combinations of the elements, Zn, Cd, S, and Se. The plane 2 which cuts across this tetrahedron and has intercepts ZnS, CdS, CdSe, and ZnSe is meant to represent all combinations in which the four basic elements are present in stoichiometric proportions. In other words

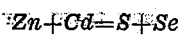

on a gram-atomic basis. This is the first limitation on the compositions of the present invention similarly to those compositions defined in the above mentioned co-pending application.

The compositions of the present invention contain varying small amounts of silver as an activator. In general, the activator may be present in amounts ranging from 0.0001 to 0.05 percent by weight of the total amount of phosphor material. A preferred amount is about 0.005 percent by weight although this amount is not very critical.

With the foregoing limitations in mind, the compositions of the present invention are further limited as represented geometrically in Fig. 2. This figure is the corner of a cuboid erected on the plane of Fig. 1. The X-axis represents a composition containing only various proportions of ZnS and ZnSe expressed as molar ratios ranging from 1 zinc sulfide to no zinc selenide at the origin O, to 1 zinc selenide and no zinc sulfide at the opposite end of the axis which is not shown. Since the stoichiometric proportion of zinc remains constant along this axis, it may also be said to represent compositions in which the molar ratio of sulfur and selenium varies in the same manner. The first division to the right of the origin therefore represents a composition having a molar ratio of .9 sulfur to 0.1 selenium. The proportions along this axis are expressed as decimals with the entire length of the axis taken as unity and each division being 0.1.

Similarly, the Y-axis represents various proportions of zinc and cadmium sulfides and the Z-axis represents various amounts of silver added as an activator up to 0.05 percent by weight of the total base material phosphor content.

The high efficiency compositions of the present invention are represented by the smaller cuboid 3 occupying one corner of the large cuboid. This figure illustrates several characteristics of the compositions. One of these is that compositions may be made up which contain no cadmium. These would be all the compositions falling within the front plane face of the small suboid 3. Other characteristics are that the compositions contain molar ratios of from .86 to .998 sulfur compared with from .002 to .14 selenium, and from .95 to 1 zinc, compared with zero to .05 cadmium, and .0001 to .05 percent by weight, based on the total weight of phosphor base material, of silver as activator.

Some specific examples of compositions made according to the present invention are shown in the table below:

Table 1

|   | ZnS | ZnSe | CdS | NaCl | Ml.AgNO$_3$ (.0001 g.Ag/Ml.) |
|---|---|---|---|---|---|
| A | G. 9.291 | G. 0.709 |   | G. 0.2 | 5 |
| B | 8.587 | 1.413 |   | 0.2 | 5 |
| C | 9.278 | 0.361 | 0.361 | 0.2 | 5 |

The anhydrous pure salts are comminuted and well mixed in a fused-silica crucible, moistened with pure distilled water and the activator solution added. The mixture is stirred, evaporated to dryness and heated in a silicon carbide resistance furnace at or above atmospheric pressure, starting at room temperature and attaining 780° C. in about 45 minutes. The temperature is held at this point for 6 minutes after which the reaction product is removed from the furnace and cooled. Conditions are provided during heating and cooling to allow only a minimum amount of oxidation. One effective way of doing this is to place the crucible containing the phosphor mixture within a larger covered crucible packed with zinc sulfide. Any oxygen leaking into the larger crucible unites with the packing of zinc sulfide and therefore cannot adversely affect the substances within the smaller crucible. The sodium chloride serves as a flux.

The resultant phosphors are washed to remove soluble chlorides and sodium sulphide and selenide produced by reaction between the flux and phosphor ingredients. Alkali halides other than sodium chloride are also preferred as fluxes. Their concentrations in the initial furnace batch may be varied from 0.01 to 20 percent by weight although optimum results are obtained in the range of about 0.5 to 4 percent.

The crystallization temperatures and heating and cooling times are not very critical. The temperature of crystallization may be varied from about 500° C. to about 1,400° C. and the crystallization time may be varied from about 5 minutes to about 20 hours depending upon the particle size desired in the final phosphor.

When the phosphors listed in Table 1 are crystallized at 780° C., they have the following characteristics under cathode-ray excitation:

Table 2

|   | Peak Wavelength, Å | Relative Energy Outputs at Peak Wavelengths | Relative Cathode-luminescences |
|---|---|---|---|
| A | 4,600 | 152 | 100 |
| B | 4,600 | 126 | 97 |
| C | 4,680 | 116 | 69 |

The figures of column 2 above are the relative energy outputs compared to the output of a standard consisting of alpha-zinc silicate activated with manganese ($\alpha$-Zn$_2$SiO$_4$:Mn). The luminescence of the standard has been taken as equal to 100 units. The figures in column 3 are the relative luminescence outputs as detected by the normal human eye. The eye does not have peak sensitivity at the same point as certain objective measuring instruments nor does it respond to radiations outside the visible band of the spectrum. For these reasons, it happens that the total luminescence detected by the eye is considerably less than that detected by a blue-sensitive objective measuring instrument in the case of the improved phosphors of the present invention.

The relative peak efficiencies of phosphors A, B, and C are 20 to 50 percent higher than the previously most efficient ZnS:CdS:Ag phosphors with corresponding peak wavelengths.

By mechanically mixing the superior blue-emitting phosphors of the present invention with complementary optimum-efficiency, yellow-emitting phosphors such as one containing from 45 to 55 weight percent zinc sulfide and 55 to 45 weight percent cadmium sulfide and activated with silver, or with the yellow-emitting phosphors described in the previously mentioned co-pending application, a phosphor is produced having improved efficiency of white light emission. This greater efficiency is present under cathode-ray excitation, which makes it valuable for television purposes, and under corpuscular, or undulatory excitation such as ultraviolet, X-rays, etc., which also makes it of value for general illumination purposes.

The selenium content in these new phosphors affords greater stability during application and operation and results in favorable decrease in absorption of visible light as compared with the non-selenium-containing ZnS:CdS:Ag phosphors.

The new phosphors are further useful for transforming invisible radiations such as alpha particles, gamma rays, and other corpuscular or undulatory radiations into blue light which is particularly favorable for actuating blue-sensitive photoresponsive devices such as photomultipliers.

I claim as my invention:

1. A luminescent composition consisting essentially of the reaction product formed by heating together, at from 500°–1400° C. for from about 5 minutes to about 20 hours in the presence of a flux, substances consisting of at least the first three of the four basic elements, sulfur, selenium, zinc, and cadmium, in the presence of from 0.0001 to 0.05 per cent by weight of silver as an activator and in which the basic elements are present in the following molar ratios: sulfur—.86 to .998, compared with selenium—.002 to .14, and zinc—.95 to 1, compared with cadmium—0 to .05.

2. The composition of claim 1 in which the silver activator is present in an amount substantially equal to 0.005 percent by weight of the total phosphor base material.

3. A luminescent composition consisting essentially of the reaction product formed by heating together, at from 500°–1400° C. for about 5 minutes to about 20 hours, substances consisting of at least the first three of the four basic elements, sulfur, selenium, zinc and cadmium, in the presence of 0.0001 to 0.05 percent by weight of silver as an activator and from 0.01 to 20 percent by weight of an alkali halide flux and in which the basic elements are present in the following molar ratios: sulfur—0.86–0.998, compared with selenium—0.002 to 0.14, and zinc—0.95 to 1.0 compared with cadmium 0 to 0.05.

4. A composition according to claim 3 in which said flux is an alkali chloride.

5. A composition according to claim 4 in which said alkali chloride is present in an amount of about 0.5 to 4.0 percent by weight.

HUMBOLDT W. LEVERENZ.

REFERENCES CITED

The following references are of record in the file of this patent:

UNITED STATES PATENTS

| Number | Name | Date |
|---|---|---|
| 2,402,757 | Leverenz | June 25, 1946 |